US007862421B2

(12) United States Patent

Marks et al.

(10) Patent No.: US 7,862,421 B2
(45) Date of Patent: Jan. 4, 2011

(54) GAMING DEVICE AND METHOD HAVING INCREASING PAYLINE WAGER AMOUNTS

(75) Inventors: Daniel M. Marks, Washington, DC (US); Anthony M. Singer, Ringwood, NJ (US); Howard M. Marks, Scarsdale, NY (US)

(73) Assignee: IGT, Reno, NV (US)

( * ) Notice: Subject to any disclaimer, the term of this patent is extended or adjusted under 35 U.S.C. 154(b) by 882 days.

(21) Appl. No.: 11/292,672

(22) Filed: Dec. 2, 2005

(65) Prior Publication Data

US 2006/0121969 A1 Jun. 8, 2006

Related U.S. Application Data

(60) Provisional application No. 60/634,005, filed on Dec. 6, 2004.

(51) Int. Cl.
*A63F 13/00* (2006.01)

(52) U.S. Cl. .............................. 463/20; 463/16; 463/17

(58) Field of Classification Search ............. 463/16–20, 463/25, 40–42
See application file for complete search history.

(56) References Cited

U.S. PATENT DOCUMENTS

| | | | |
|---|---|---|---|
| 4,448,419 | A | 5/1984 | Telnaes |
| 4,624,459 | A | 11/1986 | Kaufman |
| 4,669,731 | A | 6/1987 | Clarke |
| 4,695,053 | A | 9/1987 | Vazquez, Jr. et al. |
| 4,721,307 | A | 1/1988 | Okada |
| 4,838,552 | A | 6/1989 | Hagiwara |
| 4,991,848 | A | 2/1991 | Greenwood et al. |
| 5,116,055 | A | 5/1992 | Tracy |
| RE34,244 | E | 5/1993 | Hagiwara |
| 5,209,479 | A | 5/1993 | Nagao et al. |
| 5,344,144 | A | 9/1994 | Canon |
| 5,393,061 | A | 2/1995 | Manship et al. |
| 5,395,111 | A | 3/1995 | Inoue |
| 5,397,125 | A | 3/1995 | Adams |
| 5,437,451 | A | 8/1995 | Fulton |
| 5,449,173 | A | 9/1995 | Thomas et al. |
| 5,489,101 | A | 2/1996 | Moody |
| 5,511,781 | A | 4/1996 | Wood et al. |
| 5,531,448 | A | 7/1996 | Moody |
| 5,580,053 | A | 12/1996 | Crouch |
| 5,584,764 | A | 12/1996 | Inoue |

(Continued)

FOREIGN PATENT DOCUMENTS

AU 199716432 B2 9/1997

(Continued)

OTHER PUBLICATIONS

Black Swan advertisement by IGT, published prior to 2001.

(Continued)

*Primary Examiner*—John M Hotaling
*Assistant Examiner*—Eric M Thomas
(74) *Attorney, Agent, or Firm*—K&L Gates LLP

(57) ABSTRACT

A gaming device which includes a variety of methods to enhance payline awards by increasing one or more payline wager amounts. In one embodiment, a predetermined symbol appearing on a payline increases the wager amount of that payline by a random amount.

24 Claims, 7 Drawing Sheets

U.S. PATENT DOCUMENTS

| | | | | |
|---|---|---|---|---|
| 5,611,535 | A | 3/1997 | Tiberio | |
| 5,645,485 | A | 7/1997 | Clapper, Jr. | |
| 5,732,950 | A | 3/1998 | Moody | |
| 5,752,881 | A | 5/1998 | Inoue | |
| 5,769,716 | A | 6/1998 | Saffari et al. | |
| 5,816,916 | A | 10/1998 | Moody | |
| 5,817,172 | A | 10/1998 | Yamada et al. | |
| 5,823,873 | A | 10/1998 | Moody | |
| 5,833,537 | A | 11/1998 | Barrie | |
| 5,848,932 | A | 12/1998 | Adams | |
| 5,882,261 | A | 3/1999 | Adams | |
| 5,890,962 | A | 4/1999 | Takemoto | |
| 5,910,048 | A | 6/1999 | Feinberg | |
| 5,954,335 | A | 9/1999 | Moody | |
| 5,967,893 | A | 10/1999 | Lawrence et al. | |
| 5,984,781 | A | 11/1999 | Sunaga | |
| 5,984,782 | A | 11/1999 | Inoue | |
| 5,993,316 | A | 11/1999 | Coyle et al. | |
| 5,997,401 | A | 12/1999 | Crawford | |
| 6,004,207 | A | 12/1999 | Wilson, Jr. et al. | |
| 6,007,066 | A | 12/1999 | Moody | |
| 6,012,983 | A | 1/2000 | Walker et al. | |
| 6,027,115 | A | 2/2000 | Griswold et al. | |
| 6,033,307 | A | 3/2000 | Vancura | |
| 6,056,642 | A | 5/2000 | Bennett | |
| 6,059,289 | A | 5/2000 | Vancura | |
| 6,062,980 | A | 5/2000 | Luciano | |
| 6,089,978 | A | 7/2000 | Adams | |
| 6,093,102 | A | 7/2000 | Bennett | |
| 6,095,921 | A | 8/2000 | Walker et al. | |
| 6,098,985 | A | 8/2000 | Moody | |
| 6,102,400 | A | 8/2000 | Scott et al. | |
| 6,110,041 | A | 8/2000 | Walker et al. | |
| 6,113,098 | A | 9/2000 | Adams | |
| 6,120,377 | A | 9/2000 | McGinnis, Sr. et al. | |
| 6,120,378 | A | 9/2000 | Moody et al. | |
| 6,126,542 | A | 10/2000 | Fier | |
| 6,155,925 | A | 12/2000 | Giobbi et al. | |
| 6,158,741 | A | 12/2000 | Koelling | |
| 6,159,095 | A | 12/2000 | Frohm et al. | |
| 6,159,097 | A | 12/2000 | Gura | |
| 6,159,098 | A | 12/2000 | Slomiany et al. | |
| 6,165,070 | A | 12/2000 | Nolte et al. | |
| 6,168,522 | B1 | 1/2001 | Walker et al. | |
| 6,168,523 | B1 | 1/2001 | Piechowiak et al. | |
| 6,174,233 | B1 | 1/2001 | Sunaga et al. | |
| 6,174,235 | B1 | 1/2001 | Walker et al. | |
| 6,186,894 | B1 | 2/2001 | Mayeroff | |
| 6,190,254 | B1 | 2/2001 | Bennett | |
| 6,200,217 | B1 | 3/2001 | Osawa | |
| 6,203,429 | B1 | 3/2001 | Demar et al. | |
| 6,210,277 | B1 | 4/2001 | Stefan | |
| 6,213,877 | B1 | 4/2001 | Walker et al. | |
| 6,220,959 | B1 | 4/2001 | Holmes, Jr. et al. | |
| 6,224,482 | B1 | 5/2001 | Bennett | |
| 6,224,483 | B1 | 5/2001 | Mayeroff | |
| 6,227,969 | B1 | 5/2001 | Yoseloff | |
| 6,227,971 | B1 | 5/2001 | Weiss | |
| 6,231,442 | B1 | 5/2001 | Mayeroff | |
| 6,231,445 | B1 | 5/2001 | Acres | |
| 6,238,287 | B1 | 5/2001 | Komori et al. | |
| 6,241,607 | B1 | 6/2001 | Payne et al. | |
| 6,244,957 | B1 | 6/2001 | Walker et al. | |
| 6,254,482 | B1 | 7/2001 | Walker et al. | |
| 6,261,178 | B1 | 7/2001 | Bennett | |
| 6,270,409 | B1 | 8/2001 | Shuster | |
| 6,270,411 | B1 | 8/2001 | Gura et al. | |
| 6,299,165 | B1 | 10/2001 | Nagano | |
| 6,302,791 | B1 | 10/2001 | Frohm et al. | |
| 6,309,299 | B1 | 10/2001 | Weiss | |
| 6,311,976 | B1 | 11/2001 | Yoseloff et al. | |
| 6,312,331 | B1 | 11/2001 | Tamaki | |
| 6,315,660 | B1 | 11/2001 | DeMar et al. | |
| 6,315,662 | B1 | 11/2001 | Jorasch et al. | |
| 6,328,649 | B1 | 12/2001 | Randall et al. | |
| 6,334,814 | B1 | 1/2002 | Adams | |
| 6,336,860 | B1 | 1/2002 | Webb | |
| 6,336,862 | B1 | 1/2002 | Byrne | |
| 6,364,766 | B1 | 4/2002 | Anderson et al. | |
| 6,413,162 | B1 | 7/2002 | Baerlocher et al. | |
| 6,419,579 | B1 | 7/2002 | Bennett | |
| 6,439,993 | B1 | 8/2002 | O'Halloran | |
| 6,471,208 | B2 | 10/2002 | Yoseloff et al. | |
| 6,491,584 | B2 | 12/2002 | Graham et al. | |
| 6,517,432 | B1 | 2/2003 | Jaffe | |
| 6,533,279 | B2 | 3/2003 | Moody et al. | |
| 6,547,242 | B1 | 4/2003 | Sugiyama et al. | |
| 6,551,187 | B1 | 4/2003 | Jaffe | |
| 6,558,253 | B1 | 5/2003 | DeSimone et al. | |
| 6,561,900 | B1 | 5/2003 | Baerlocher et al. | |
| 6,604,999 | B2 | 8/2003 | Ainsworth | |
| 6,605,002 | B2 | 8/2003 | Baerlocher | |
| 6,612,927 | B1 | 9/2003 | Slomiany et al. | |
| 6,616,142 | B2 | 9/2003 | Adams | |
| 6,638,164 | B2 | 10/2003 | Randall et al. | |
| 6,695,696 | B1 | 2/2004 | Kaminkow | |
| 6,729,621 | B2 | 5/2004 | Moody | |
| 6,739,973 | B1 * | 5/2004 | Lucchesi et al. | 463/35 |
| 6,802,773 | B2 | 10/2004 | Moody | |
| 7,258,611 | B2 | 8/2007 | Bigelow, Jr. et al. | |
| 2001/0004606 | A1 * | 6/2001 | Tracy et al. | 463/16 |
| 2001/0007828 | A1 * | 7/2001 | Walker et al. | 463/26 |
| 2002/0094857 | A1 | 7/2002 | Meyer | |
| 2002/0119814 | A1 * | 8/2002 | Fong et al. | 463/13 |
| 2002/0198044 | A1 * | 12/2002 | Walker et al. | 463/25 |
| 2003/0017868 | A1 * | 1/2003 | Crawford | 463/20 |
| 2003/0045345 | A1 | 3/2003 | Berman | |
| 2003/0060259 | A1 * | 3/2003 | Mierau et al. | 463/16 |
| 2003/0060268 | A1 * | 3/2003 | Falconer | 463/20 |
| 2003/0207706 | A1 * | 11/2003 | Potter et al. | 463/16 |
| 2003/0216165 | A1 * | 11/2003 | Singer et al. | 463/20 |
| 2004/0009803 | A1 | 1/2004 | Bennett et al. | |
| 2004/0023714 | A1 | 2/2004 | Asdale | |

FOREIGN PATENT DOCUMENTS

| | | | |
|---|---|---|---|
| AU | 199717601 | B2 | 9/1997 |
| AU | A-50327/96 | | 10/1997 |
| AU | A-63553/98 | | 10/1998 |
| DE | 3700861 | A1 | 7/1988 |
| DE | 4014477 | A1 | 7/1991 |
| EP | 0 060 019 | | 9/1982 |
| EP | 0 410 789 | | 7/1990 |
| EP | 0 688 002 | A1 | 12/1995 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 984 408 | A2 | 3/2000 |
| EP | 0 984 409 | A2 | 3/2000 |
| GB | 2 083 936 | A | 3/1982 |
| GB | 2 092 797 | B | 8/1982 |
| GB | 2 144 644 | A | 3/1985 |
| GB | 2 170 636 | A | 2/1986 |
| GB | 2 226 907 | A | 7/1990 |
| GB | 2 328 311 | A | 2/1999 |
| WO | WO 85/00910 | | 2/1985 |
| WO | WO 97/32285 | | 9/1997 |
| WO | WO 00/12186 | | 3/2000 |
| WO | WO 00/66235 | | 11/2000 |
| WO | WO 00/76606 | A1 | 12/2000 |
| WO | WO 01/87441 | | 11/2001 |
| WO | WO 03/026758 | A1 | 4/2003 |

WO WO2006014657 2/2006

OTHER PUBLICATIONS

Bonus Times Article written by Strictly Slots, published in Jul. 2000.
Enchanted Unicorn Advertisement, written by IGT, published in 2001.
Leopard Spots™ (website) written by www.igt.com, printed Mar. 21, 2001.
Mega Multiplier® (website) written by www.wmsgaming.com, printed May 22, 2001.
Penguin Pays Advertisement, written by Aristocrat Incorporated, published in 1998.
Polly & Roger Brochure written by VLC, Inc, published in 2000, on or before December thereof.
Reel MAGIC™ Gaming Machine Description, written by IGT, available in 1986.
Slot Machines Article, written by Marshall Fey, published 1983, 1989, 1991, 1994 and 1997.
Super Times Pay Poker advertisement written by www.actiongaming.com printed Mar. 24, 2005.
Take Your Pick Advertisement written by IGT/Anchor Gaming, published in 1999, on or before December thereof.
Take Your Pick Article written by Strictly Slots, published in Mar. 2001.
Totem Pole Advertisement written by IGT, published in 1997.
Vision Series™/Good Times™ Brochure written by IGT, published in 1999, on or before December thereof.
Winning Streak Web Site Description written by WMS Gaming Inc. (web site), printed on Mar. 21, 2001.
X Factor Brochure written by WMS Gaming, Inc., published in 1998, on or before December thereof.

* cited by examiner

GAMING DEVICE AND METHOD HAVING INCREASING PAYLINE WAGER AMOUNTS

PRIORITY CLAIM

This application is a non-provisional patent application that claims priority to and the benefit of U.S. Provisional Patent Application Ser. No. 60/634,005 filed on Dec. 6, 2004, the entire contents of which is incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD OF INVENTION

In general, the present invention relates to award enhancement for slot machine games. More particularly, the present invention enhances payline awards by increasing one or more payline wager amounts.

BACKGROUND OF THE INVENTION

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use devices such as reels or wheels to enhance the attraction of the gaming machines to players and also to enhance the player's game playing experience.

In one slot gaming device, the gaming device includes a plurality of reels and one or more paylines. Such gaming devices include any suitable number of reels, such as three to five reels, which each display any suitable number of symbols per reel, such as three symbols per reel. In these gaming devices, the player initiates the spinning of the reels by making one or more wagers on one or more paylines. Such gaming devices may have one, three, five, nine, fifteen, twenty-five or any other suitable number of paylines which are horizontal, vertical, diagonal or any combination thereof. The player wagers on a player selected number or combination of paylines, such as one, two, three, five, ten or fifteen paylines and the reels are activated to spin.

After the reels spin to generate a plurality of symbols, the gaming device analyzes the generated symbols to determine if the gaming device has randomly generated a winning symbol or winning symbol combination on one or more of the wagered on paylines. A conventional line pay award is calculated by multiplying the award value for the winning symbol combination by the amount wagered upon the payline upon which the winning symbol combination appears. Such calculated awards are provided to the player.

New methods of playing slot machines, therefore, are required to provide players, casinos, and manufacturers with uniquely entertaining slot machine games, including enhancing payline awards by increasing one or more payline wager amounts.

SUMMARY OF THE INVENTION

The present invention includes a variety of methods to enhance payline awards by increasing one or more payline wager amounts. In one embodiment, a predetermined symbol appearing on a payline increases the wager amount of that payline by an amount, such as a randomly determined amount or a fixed amount.

In one embodiment, upon a suitable triggering event, such as the appearance or generation of a designated or trigger symbol on a payline, the gaming device modifies the amount wagered on one or more paylines without requiring the player to wager any additional credits. The player's award, if any, is determined by multiplying the base award amount associated with any symbol or symbol combination generated on that payline by the modified amount wagered on that payline. In one embodiment, the gaming device increases the amount wagered on one or more paylines (without requiring the player to wager any additional credits) and multiplies the base award amount associated with any symbol combination generated on that payline by the increased amount wagered.

For example, if a symbol combination associated with a base award amount of 10 credits is generated on a first payline which the player wagered 2 credits on, the player is provided a total award of 20 credits. However, if a designated or trigger symbol is generated on the same first payline, the gaming device, without requiring the player to wager any additional credits, increases the number of credits wagered on the first payline from 2 credits to 30 credits. Accordingly, the base award amount of 10 credits associated with the symbol combination generated on the first payline is multiplied by the increased wager of 30 credits on the first payline to result in a modified total award of 300 credits.

In different embodiments, the amount each payline wager amount is modified to is predetermined, randomly determined, determined based on the player's wager, determined based on the player's status (such as determined through a player tracking system), determined based on time or determined based on any other suitable method. In one embodiment, the amount each payline wager amount is modified is randomly selected from a range of amounts or a pool of amounts. In this embodiment, which amount is randomly selected from the range or pool may be based on the player's total wager placed or on the player's wager placed on the payline which the trigger symbol was generated on. For example, the greater the player's wager, the greater the probability that the gaming device will substantially increase one or more of the player's payline wager amounts.

Other objects, features and advantages will be apparent from the following detailed disclosure, taken in conjunction with the accompanying sheets of drawings, wherein like numerals refer to like parts, elements, components, steps and processes.

DESCRIPTION OF THE INVENTION

Figure 1A:
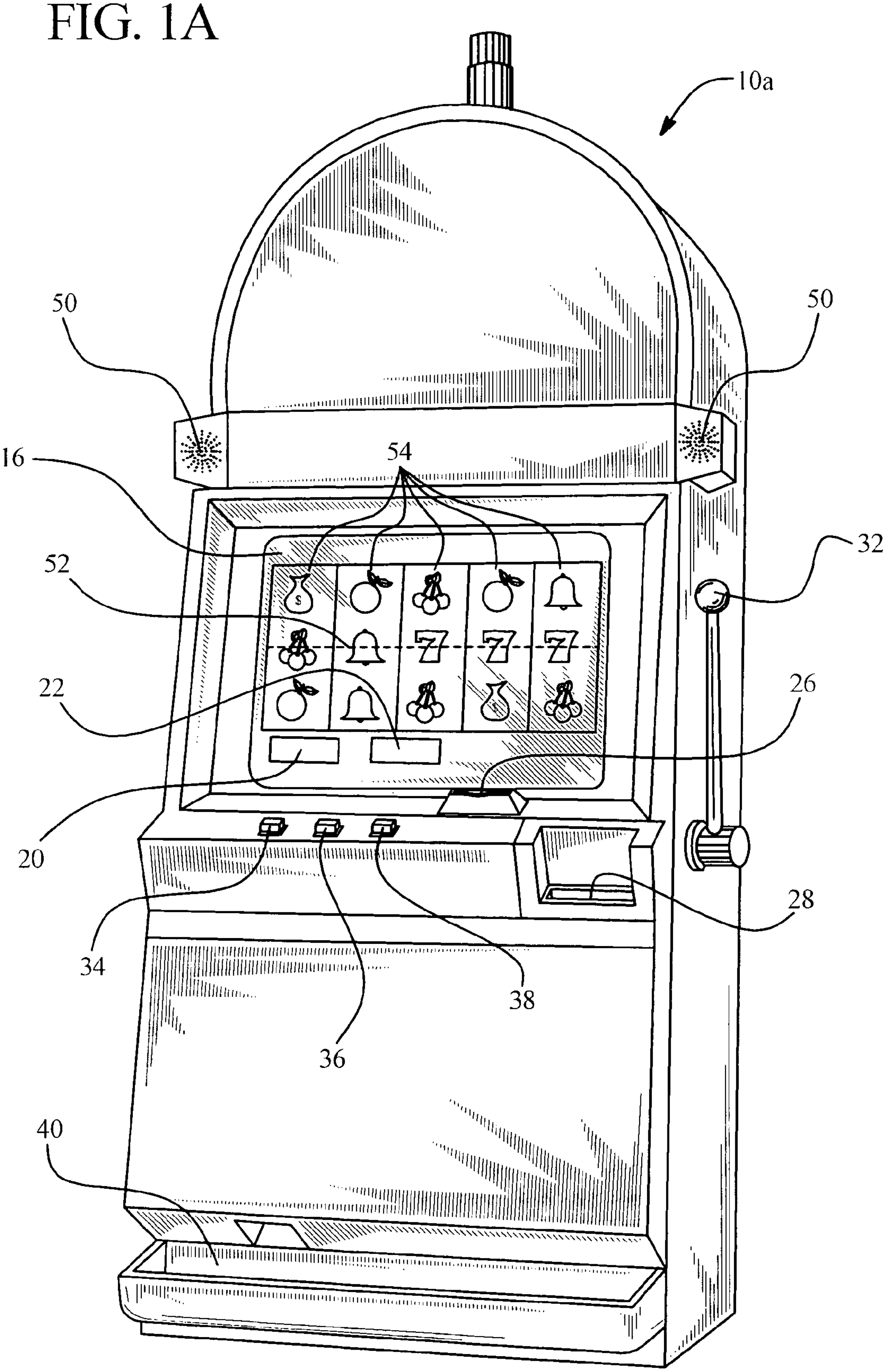
FIG. 1A is a front perspective view of one embodiment of the gaming device disclosed herein.
Figure 1B:
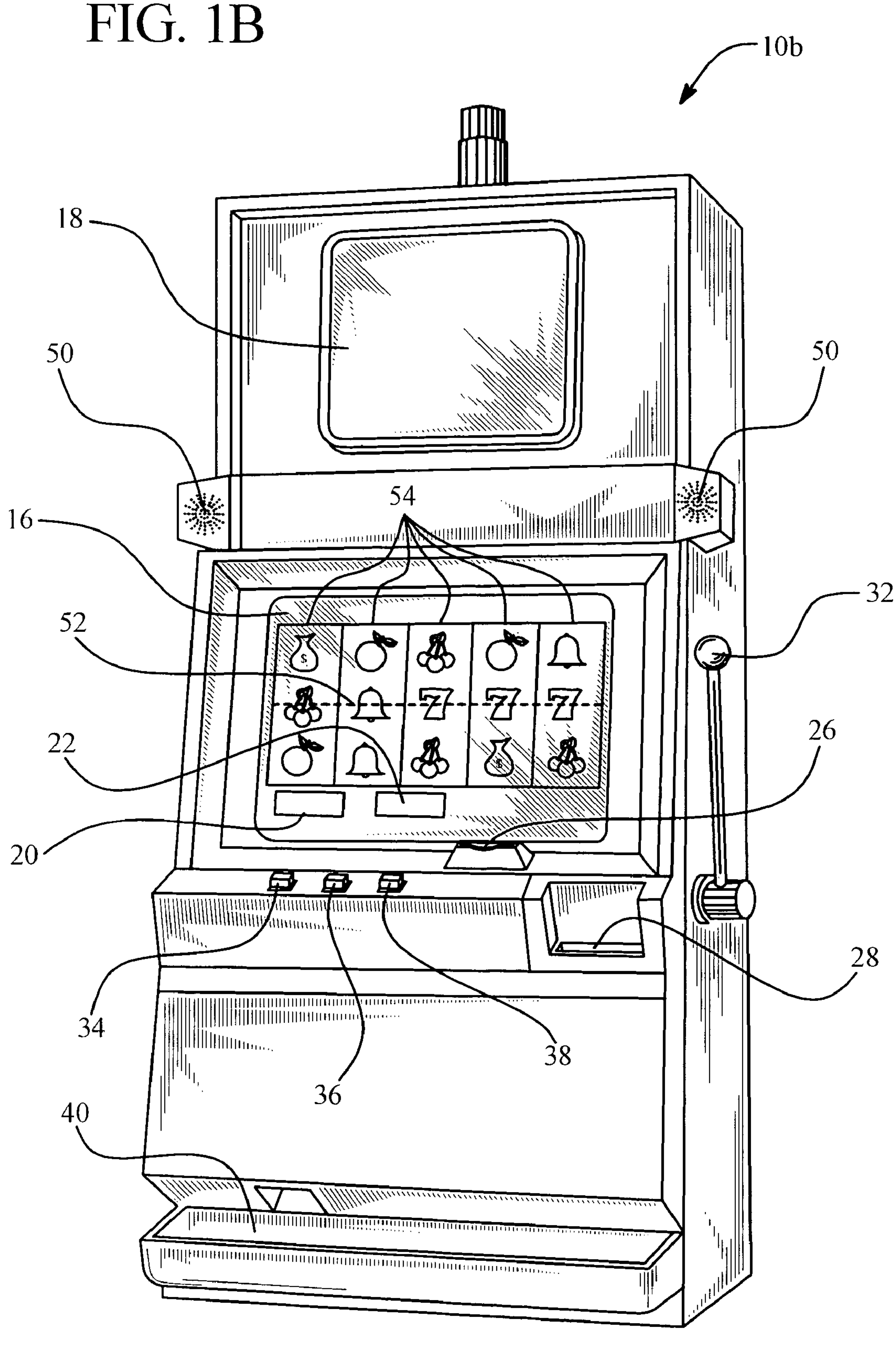
FIG. 1B is a front perspective view of another embodiment of the gaming device disclosed herein.

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
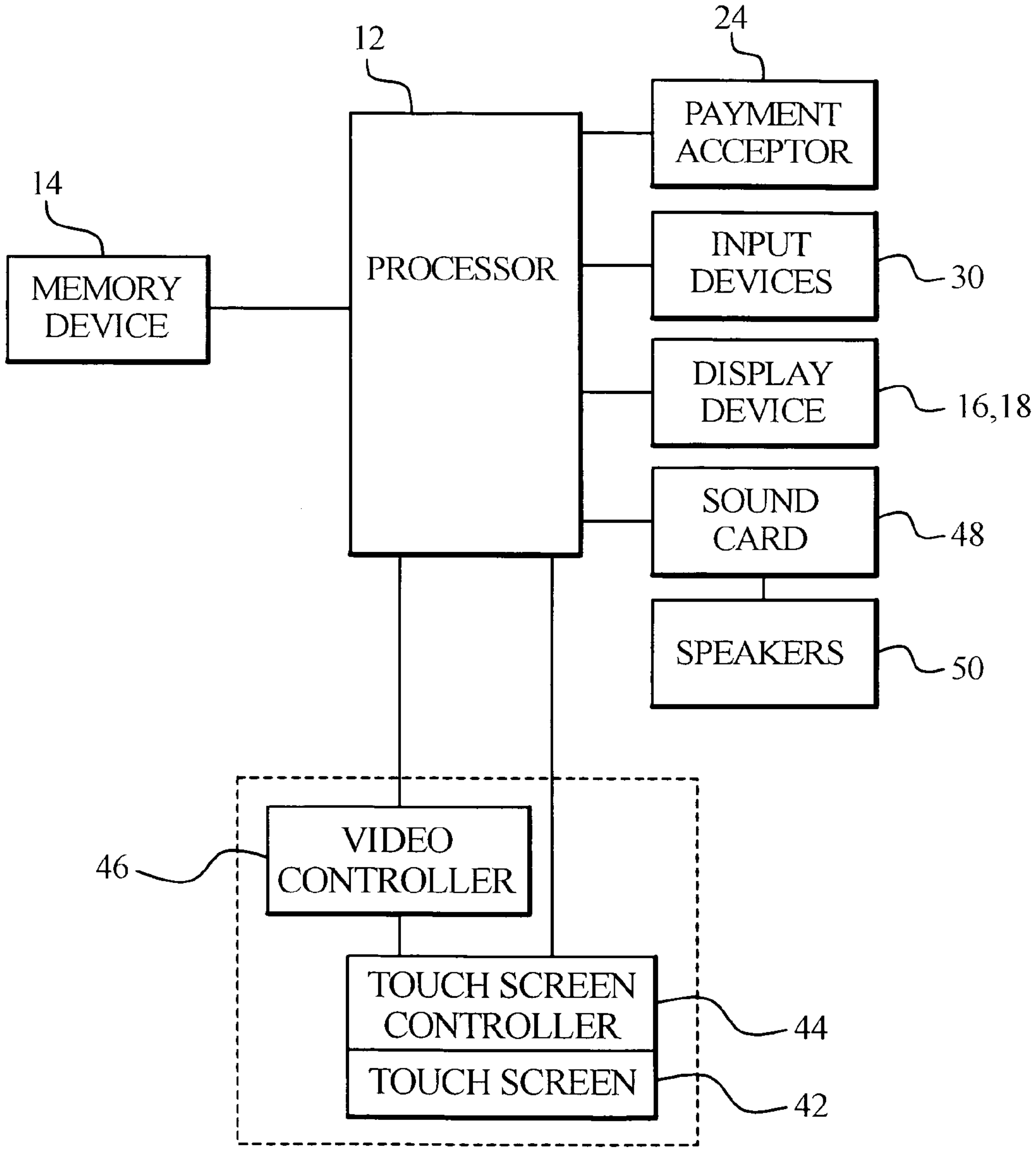
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols such as bells, hearts, fruits, numbers, letters, bars or other images which preferably correspond to a theme associated with the gaming device. Accordingly, the plurality of reels form a symbol matrix with a plurality of paylines. In different embodiments, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
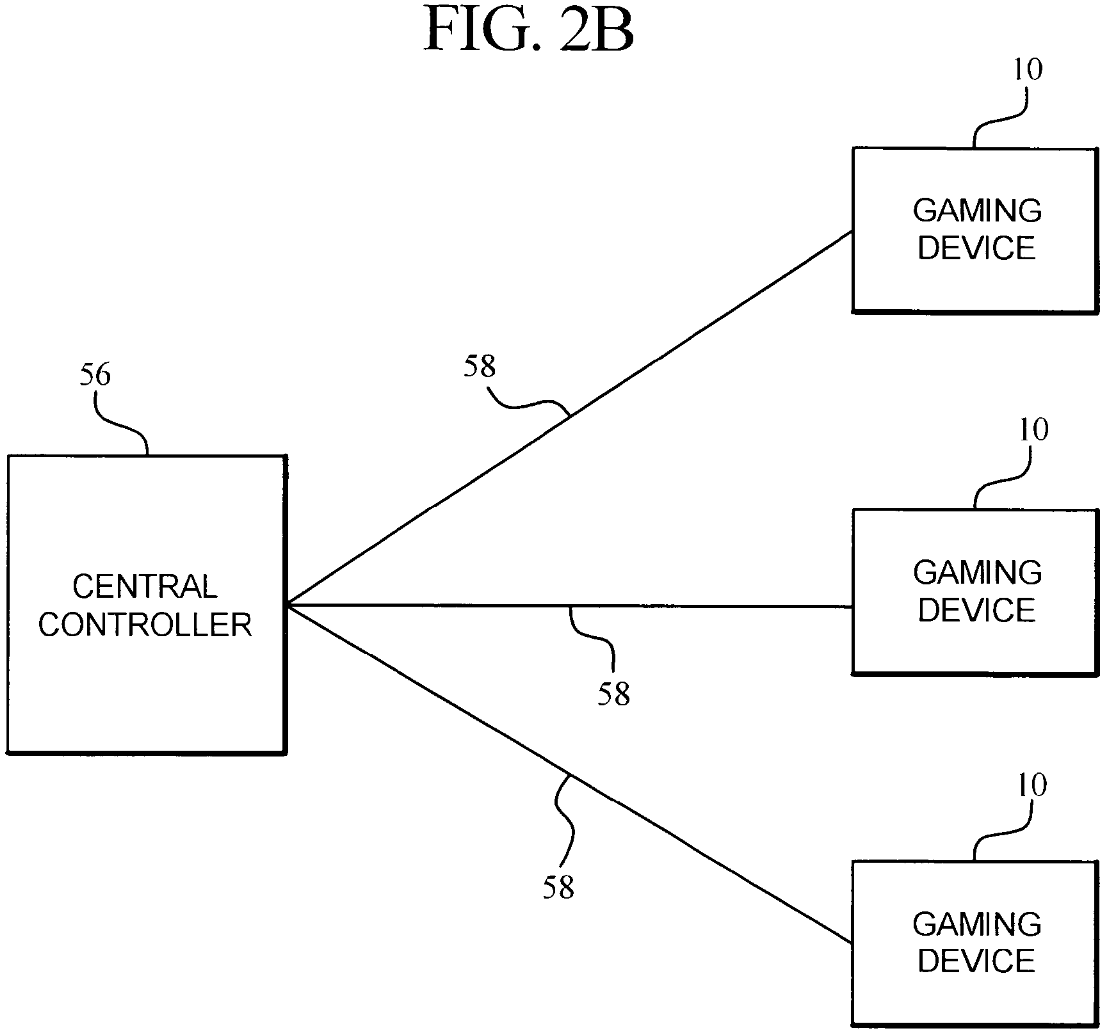
FIG. 2B is a schematic block diagram of one embodiment of a network configuration for a plurality of gaming devices disclosed herein.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Figure 3:
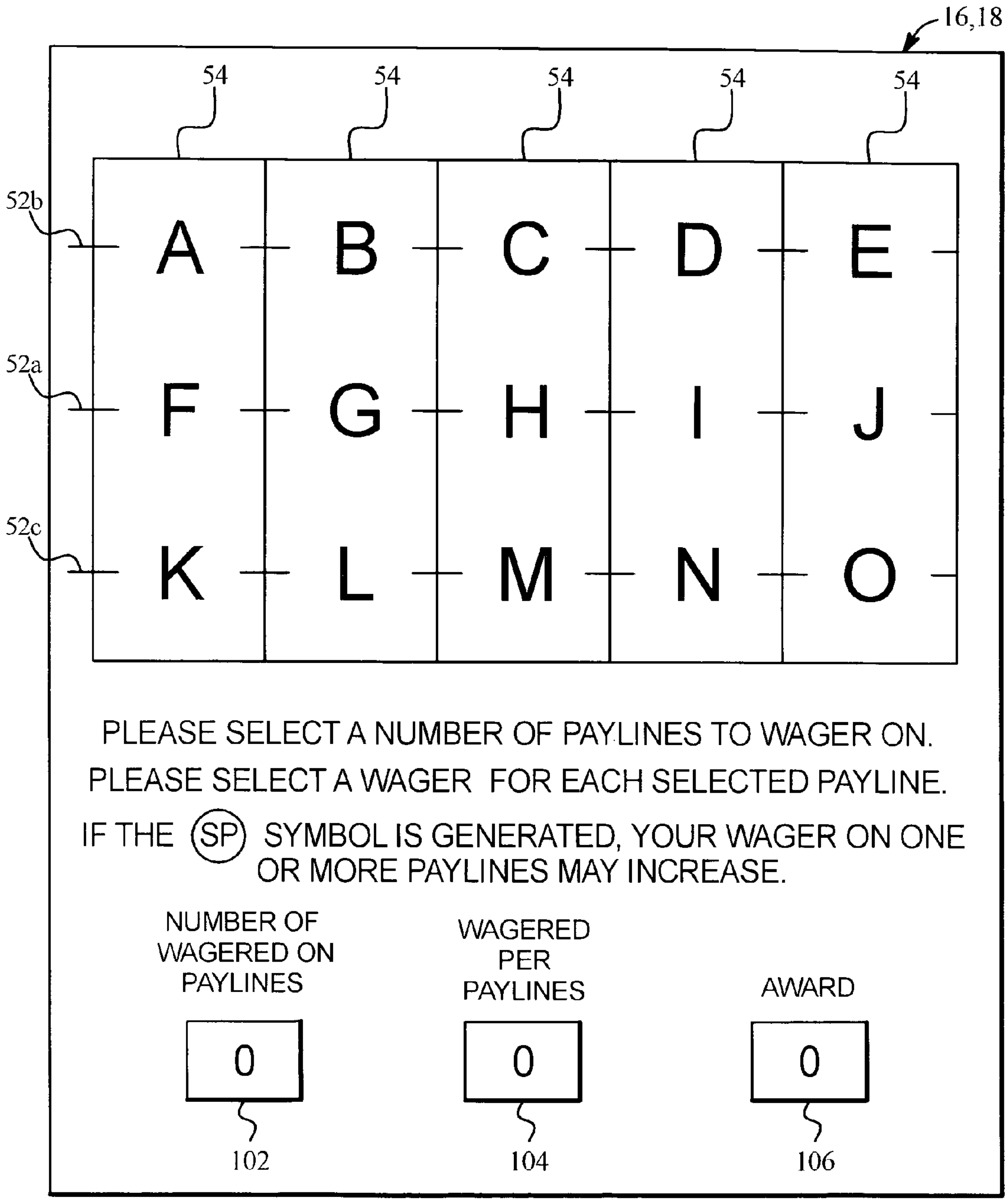
FIG. 3 is front elevation view of one of the display devices of the gaming device disclosed herein, illustrating a plurality of symbols generated on the reels.

Referring now to FIG. 3, in one embodiment, the plurality of reels 54 include 15 viewable symbol positions wherein each symbol position displays one of the first 15 letters of the alphabet, A through O. In this embodiment, the gaming device includes five paylines 52 wherein payline one 52*a* runs through the symbol positions which display symbols F, G, H, I, J; payline two 52*b* runs through the symbol positions which display symbols A, B, C, D, E; and payline three 52*c* runs through the symbol positions which display symbols K, L, M, N, O. Additionally, payline four (not shown) runs through the symbol positions which display symbols A, G, M, I, E; and payline five (not shown) runs through the symbol positions which display symbols K, G, C, I, O.

In one embodiment, the gaming device enables the player to select each of the paylines and place a wager amount on each of the selected paylines. Appropriate messages such as "PLEASE SELECT A NUMBER OF PAYLINES TO WAGER ON", "PLEASE SELECT A WAGER FOR EACH SELECTED PAYLINE" and "IF A SP SYMBOL IS GENERATED, YOUR WAGER ON ONE OR MORE PAYLINES MAY INCREASE" may be provided to the player visually, or through suitable audio or audiovisual displays. In one embodiment, the player must place the same wager amount on each selected payline. In another embodiment, the player may place different wager amounts on each selected payline.

After wagering upon the paylines, the symbols are randomly rearranged and redisplayed on the reels and the gaming device determines if a special or triggering symbol is generated on the reels. If no special symbol is generated on the reels, the gaming device proceeds in analyzing the generated or rearranged symbols to determine if any winning symbol or winning symbol combination is rearranged and redisplayed on a wagered on payline. If any winning symbol or winning symbol combination is generated on a wagered on payline, the gaming device determines a payline award based on the generated winning symbol or winning symbol combination and the amount wagered on the payline which the winning symbol or winning symbol combination was generated on. The payline award is calculated by multiplying a base amount, as specified on an appropriate pay table or pay schedule, by the amount wagered on the payline.

Figure 4:
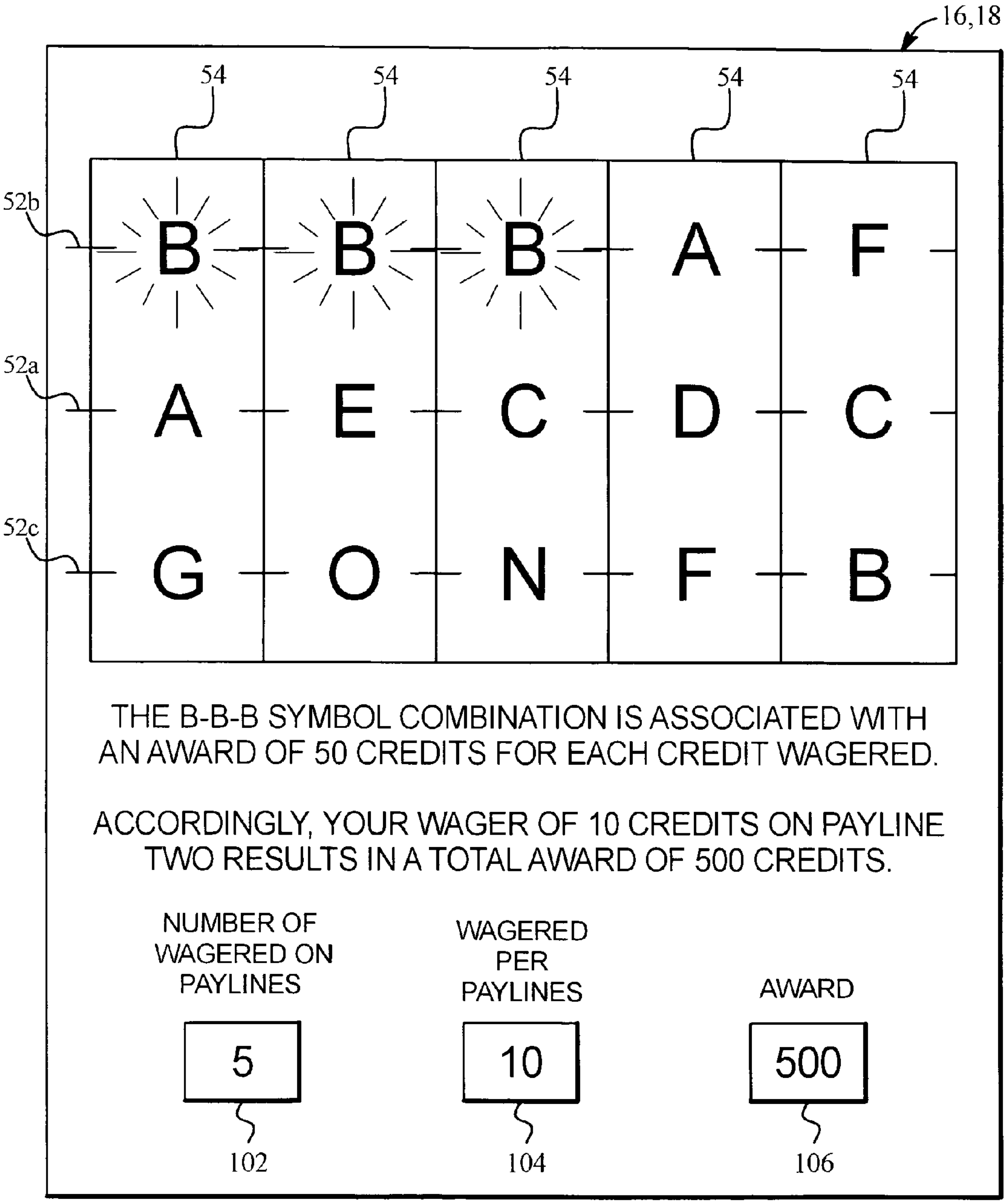
FIG. 4 is a front elevation view of one of the display devices of the gaming device disclosed herein, illustrating a winning symbol combination generated on a payline.

For example, as seen in FIG. 4, after the player selected to place a wager of ten credits (as indicated in the wager per payline indicator 104) on each of five paylines (as indicated in the number of wagered on paylines indicator 102), the gaming device generated a plurality of symbols at the plurality of symbol positions. The gaming device determined that no special or triggering symbol is generated on the reels. In this example, the gaming device determined that the "B-B-B" combination appearing on payline two 52*b* is a winning symbol combination. Accordingly, the gaming device determined the payline award for this winning symbol combination by multiplying a base amount of fifty credits associated with the winning "B-B-B" symbol combination by the ten credits payline wager placed on payline two for a total award of five-hundred credits (as indicated in the award indicator 106). Appropriate messages such as "THE B-B-B SYMBOL COMBINATION IS ASSOCIATED WITH AN AWARD OF 50 CREDITS FOR EACH CREDIT WAGERED" and "ACCORDINGLY, YOUR WAGER OF 10 CREDITS ON PAYLINE TWO RESULTS IN A TOTAL AWARD OF 500 CREDITS" may be provided to the player visually, or through suitable audio or audiovisual displays.

On the other hand, if the gaming device determines that a special or triggering symbol is generated on the reels, the gaming device modifies the payline wager amount on one or more paylines. After modifying one or more payline wager amounts, the gaming device proceeds in analyzing the generated symbols to determine if any winning symbol or winning symbol combination are generated on any wagered on paylines. If any winning symbols or winning symbol combinations are generated on any wagered on payline, the gaming device determines an enhanced payline award based on the generated winning symbol or winning symbol combination and the modified amount wagered on the payline which the winning symbol or winning symbol combination was generated on. In one embodiment, the enhanced payline award is calculated by multiplying a base amount, as specified on an appropriate pay table or pay schedule, by the modified amount wagered for that payline.

Figure 5:
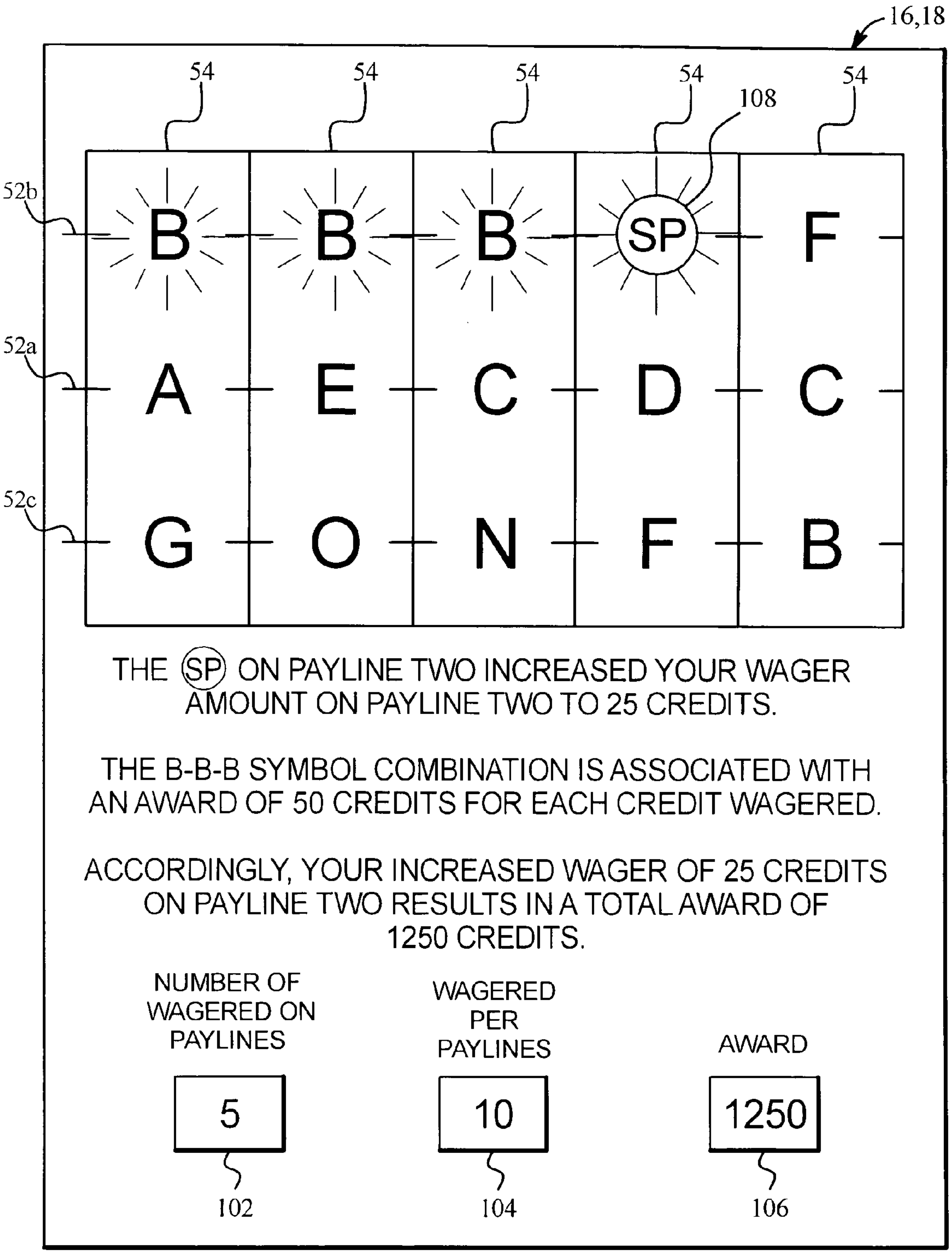
FIG. 5 is a front elevation view of one of the display devices of the gaming device disclosed herein, illustrating a predetermined triggering symbol and a winning symbol combination generated on a payline, wherein the generated triggering symbol causes an increase in the amount wagered on the payline.

FIG. 5 illustrates when one or more payline awards are enhanced by the appearance of a predetermined designated special or triggering symbol 108 appearing on a payline. In this example, the special symbol enhances the payline award by modifying the wager amount on that payline. The generation of the special symbol 108 causes the gaming device to increase the wager amount on payline two 52*b* from ten credits to twenty-five credits. As described above, the gaming device does not require the player to wager any additional credits to increase the wager amount on payline two. After increasing the wager amount on payline two, the gaming device determines an enhanced award for winning symbol combination "B-B-B" on payline two 52*b* by multiplying the base amount of fifty credits associated with the winning "B-B-B" symbol combination by the increased twenty-five credits payline wager placed on payline two for a total award of one-thousand-two-hundred-fifty credits (as indicated in the award indicator 106). Appropriate messages such as "THE SP ON PAYLINE TWO INCREASED YOUR WAGER AMOUNT ON PAYLINE TWO TO 25 CREDITS", "THE B-B-B SYMBOL COMBINATION IS ASSOCIATED WITH AN AWARD OF 50 CREDITS FOR EACH CREDIT WAGERED" and "ACCORDINGLY, YOUR INCREASED WAGER OF 25 CREDITS ON PAYLINE TWO RESULTS IN A TOTAL AWARD OF 1250 CREDITS"

It should be appreciated that even though a triggering symbols is generated on a payline and one or more payline wager amounts are modified, unless a winning symbol or winning symbol combination is generated on such paylines with modified wager amounts, no award will be provided to the player. For example, if a triggering symbol is generated on a first payline and the wager amount on the first payline is increased from five credits to five-hundred credits and no winning symbol or winning symbol combination is generated on the first payline, the player's award for the first payline is zero. It should be appreciated that this increases the volatility of the gaming device because even if the gaming device modifies one or more payline wager amounts, the player is not guaranteed a payout unless a winning symbol or winning symbol combination is generated on the payline with the modified wager amount.

In one embodiment, the modification of an amount wagered on a payline may qualify that payline for another paytable which has a non-linear relationship with the previous paytable which corresponded to the player's non-modified amount wagered. For example, a winning symbol combination of three "7" symbols on a payline with a non-modified amount wagered of two credits may result in a payout of five-hundred credits. However, if the amount wagered on that payline is increased to three credits, then a winning symbol combination of three "7" symbols on a payline with a modified amount wagered of three credits may result in a payout of one-thousand credits. In another embodiment, the modification of an amount wagered on a payline may qualify that payline for a different payout on the same payout. In this embodiment, each winning symbol or winning symbol combination is associated with a plurality of different payouts, wherein the payouts are based on the player's wager. If a winning symbol or winning symbol combination is generated and one or more payline wager amounts are increased (i.e., via the generation of a special triggering symbol), the same winning symbol or winning symbol combination is provided an increased payout from the same paytable. For example, a paytable may associate a payout of four-hundred credits with a winning symbol combination of three cherry symbols generated on a payline with a non-modified amount wagered of two credits, but the same paytable may associate a payout of six-hundred credits with the same winning symbol combination of three cherry symbols generated on a payline with a modified wager amount of three credits.

In one embodiment, payline wager amounts increase or decrease to any amount. For example, payline wager amounts increase from five credits to one-hundred-thousand credits, or decrease from thirty credits to four credits. In one embodiment, the amount one or more payline wager amounts are increased or decreased is randomly selected from a range of amounts or a pool of amounts. In this embodiment, which amount is randomly selected from the range or pool may be based on the player's total wager placed or on the player's wager placed on the payline which the trigger symbol was generated on. For example, the greater the player's wager, the greater the probability that the gaming device will substantially increase one or more of the player's payline wager amounts.

In one embodiment, the gaming device includes a plurality of pools of amounts or values, wherein the pool which the gaming device utilizes to select the amount one or more payline wager amounts will increase or decrease is based on the player's wager or at least in part based on the player's wager. For example, a first pool with relatively smaller amounts or values may be utilized if the player places a relatively small first wager, but a second pool with relatively greater amounts or values may be utilized if the player places a relatively greater second wager. In another embodiment, each of the values or amounts in a pool is associated with a probability of being selected. In this embodiment, if a triggering event occurs, the gaming device selects, based on the percentages associated with the different values, one of the values from the pool to modify one or more of the payline wager amounts.

In another embodiment, the gaming device includes a plurality of pools of amounts or values, wherein the pool which the gaming device utilizes to select the amount one or more payline wager amounts will increase or decrease is based on the player's status (such as determined through a player tracking system). In another embodiment including a plurality of pools of amounts or values, each pool is individually associated with a number of generated triggering symbols. In this embodiment, if a number of triggering symbols are generated, the gaming device modifies the payline wager amount of one or more paylines based on an amount selected from the pool associated with the number of generated triggering symbols.

In another embodiment, the gaming device includes a plurality of pools of amounts or values wherein each pool is individually associated with one of the paylines. In this embodiment, if the gaming device modifies the payline wager amount of a specific payline, the amount the payline wager amount is modified is selected from the pool associated with that specific payline. In one such embodiment, if a number of triggering symbols are generated on each of a plurality of paylines, the amount the payline wager amount is modified is selected from the pool associated with the payline which more triggering symbols were generated on. For example, if two triggering symbols are generated on a first payline and one triggering symbol is generated on a second payline, the gaming device will utilize the pool associated with the second payline to select an amount to modify one or more payline wager amounts.

In another embodiment, the amount one or more payline wager amounts are increased or decreased is predetermined or fixed. In this embodiment, the amount one or more payline wager amounts are increased or decreased may be based on the player's total wager placed or on the player's wager placed on the payline which the trigger symbol was generated on. For example, the greater the player's wager, the greater the amount which one or more payline wager amounts will be increased if the triggering symbol is generated. In different embodiments, the amount each payline wager amount may increase or decrease to is otherwise determined based on the player's wager, determined based on the player's status (such as determined through a player tracking system), determined based on time or determined based on any other suitable method.

In another embodiment, the gaming device includes a plurality of sub-symbols. In this embodiment, as described above, the reels generate a symbol at each symbol position and zero, one or more sub-symbols are also generated at zero, one or more symbol positions. In one such embodiment, one or more predetermined triggering symbols generated are generated as sub-symbols, wherein as described above, the generation of a triggering sub-symbol results in a modified payline wager amount for one or more paylines. It should be appreciated that in one embodiment, the generation of a sub-symbol is independent of the analysis the gaming device proceeds through in determining if any awards are to be provided for any winning symbols or winning symbol combinations.

In one embodiment, all payline awards are provided to the player and all payline wager amounts reset to their pre-enhancement amounts. For example, the gaming device provides one-thousand-two-hundred-fifty credits for the symbol combination generated on payline two **52*b*** and then resets the payline wager amount on payline two from twenty-five credits back to ten credits. In another embodiment, the enhanced payline wager amounts are retained for a plurality of generations of the symbols or plays of the game. In different embodiments, the number of generations the enhanced payline wager amounts are retained for is predetermined, randomly determined, determined based on the player's wager, determined based on the player's status (such as determined through a player tracking system), determined based on time or determined based on any other suitable method.

In one embodiment, the generation of the triggering symbol increases the amount wagered on at least one payline. In another embodiment, the generation of the triggering symbol increases the amount wagered on a plurality of the paylines. In another embodiment, the generation of the triggering symbol increases the amount wagered on all wagered on paylines. In another embodiment, the generation of the triggering symbol increases the amount wagered on all paylines, regardless of if the player wagered on every payline. In another embodiment, the generation of the triggering symbol decreases the amount wagered on at least one payline. In another embodiment, the generation of the triggering symbol decreases the amount wagered on a plurality of paylines. In another embodiment, the generation of the triggering symbol decreases the amount wagered on all paylines. It should be appreciated that the generation of a triggering symbol may modify the amount wagered on at least one payline in any suitable manner.

In one embodiment, a special or triggering symbol may appear on multiple paylines and affect multiple payline wager amounts in different manners. For example, a special symbol may increase the wager amount on payline two from ten credits to twenty-five credits and payline five from ten credits to sixty credits. In different embodiments, the number of paylines with enhanced payline wager amounts is predetermined, randomly determined, determined based on the player's wager, determined based on the player's status (such as determined through a player tracking system), determined based on time or determined based on any other suitable method.

In one embodiment, any predetermined symbol or combination of symbols may modify, such as increase, payline wager amounts, such as line pay, scatter pay, wildcard and/or bonus symbols. For example, "B-B-B" forms a line pay and increases payline wager amounts.

In another embodiment, a predetermined symbol or combination of symbols only affects the wager amount of the paylines upon which the symbols appear. For example, a "B" symbol on paylines two and five only increases the wager amount on paylines two and five.

In another embodiment, a predetermined symbol or combination of symbols affects all paylines. For example, a "D" symbol on paylines two and five increases the wager amounts on all paylines. In another embodiment, a predetermined symbol or combination of symbols affects a random number of paylines. For example, "G" symbol on payline two and an "M" symbol on payline five increase the payline wager amounts on paylines one, two, three and five. In different embodiments, the paylines which a predetermined symbol or combination may affect is predetermined, randomly determined, determined based on the player's wager, determined based on a percentage, determined based on the player's status (such as determined through a player tracking system), determined based on time or determined based on any other suitable method.

In another embodiment, a payline wager amount increases or decreases any number of times during a single spin, play of the game, or symbol generation. For example, a payline wager amount increases from ten credits to fifteen credits, pauses, jumps from fifteen credits to thirty credits, pauses again, and increases again to seventy-five credits. In different embodiments, the number of times a payline wager amount will increase or decrease during a single spin, play of the game or symbol generation is predetermined, randomly determined, determined based on the player's wager, determined based on the player's status (such as determined through a player tracking system), determined based on time or determined based on any other suitable method.

In another embodiment, a payline wager amount increases or decreases any number of times over multiple spins, plays of the game or symbol generations. For example, a payline wager amount increases from seven credits to seventeen credits on spin one and then increases from seventeen credits to one-hundred-twenty credits on spin two. In different embodiments, the amount a payline wager amount may increase or decrease to over multiple spins, plays of the game or symbol generations is predetermined, randomly determined, determined based on the player's wager, determined based on the player's status (such as determined through a player tracking system), determined based on time or determined based on any other suitable method.

In another embodiment, payline wager amounts increase or decrease by the same amount for all affected paylines. For example, all affected payline wager amounts increase from three credits to forty-five credits. In another embodiment, payline wager amounts increase or decrease by a different amount for all affected paylines. For example, the wager amount for payline two increases from two credits to one-hundred credits and payline five increases from two credits to nine credits.

In another embodiment, payline awards are provided before and after all payline wager amounts are increased or decreased. For example, a ten credit award is provided before any payline wager amounts are modified and another one-hundred-fifty credit award is provided after one or more payline wager amounts increase. In another embodiment, payline awards are only provided after all payline wager amounts are increased or decreased. For example, only the one-hundred-fifty credit award is provided from the previous example.

In another embodiment, enhanced payline awards may be provided as any type of award. For example, enhanced payline awards may be provided as credits, free spins, and/or bonus features. In different embodiments, the type of award provided for an enhanced payline wager amount is predetermined, randomly determined, determined based on the player's wager, determined based on the player's status (such as determined through a player tracking system), determined based on time or determined based on any other suitable method.

In another embodiment, any suitable event may trigger the enhancement of a payline wager amount. In different embodiments, the triggering of the enhancement of a payline wager amount is predetermined, randomly determined, determined based on the player's wager, determined based on the player's status (such as determined through a player tracking system), determined based on time or determined based on any other suitable method. For example, one or more payline wager amounts may be modified based on the player's total wager, the player's wager on one or more individual paylines, the player's wins, the frequency of the player's wins and/or losses or the frequency which the player places wagers. Moreover, the gaming device may trigger the enhancement of a payline wager amount at a random frequency that increases with larger or more frequent wagers.

In one embodiment, no separate entry fee or buy in is necessary for the payline wager amount modification feature described above to be employed. In another embodiment, a side-bet or side wager must be placed by the player for the payline wager amount modification feature described above to be employed. In different embodiments, the necessary amount of the side wager is predetermined, randomly determined, determined based on the player's wager, determined based on the player's status (such as determined through a player tracking system), determined based on time or determined based on any other suitable method.

In another embodiment, the enhancement of a payline wager amount operates as a secondary bonus game on any primary game. For example, the enhancement of a payline wager amount operates as a second-screen, free spin bonus feature on a primary, traditional, video slot machine.

In another embodiment wherein the gaming device determines any outcomes based on the number of associated symbols which are generated in active symbol positions on the requisite number of adjacent reels, the generation of a triggering symbol modifies the number of active symbol positions on one or more reels.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device, for a play of a wagering game, to:

(a) for each of a plurality of predetermined paylines, enable a player to participate in the play of the wagering game by placing an individual payline wager amount on said predetermined payline, each said predetermined payline being associated with a different plurality of symbol positions;

(b) randomly generate a plurality of symbols from a plurality of different symbols, said plurality of different symbols including at least one predetermined triggering symbol;

(c) display the randomly generated plurality of symbols at the different plurality of symbol positions;

(d) determine whether the randomly generated and displayed symbols include a designated quantity of the predetermined triggering symbols, the designated quantity being at least one;

(e) if the randomly generated and displayed symbols include the designated quantity of the predetermined triggering symbols, for each of a first quantity of wagered-on predetermined paylines:

(i) modify the payline wager amount placed by the player on said wagered-on predetermined payline by a randomly determined amount, said modification occurring without requiring the player to place any additional wagers, said first quantity being at least one, said amount being randomly determined regardless of which of the symbol positions each of the randomly generated predetermined triggering symbols are displayed at; and (ii) display each modified payline wager amount;

(f) for each wagered-on predetermined payline, determine whether the randomly generated and displayed symbols at the plurality of symbol positions associated with said wagered-on predetermined payline form any of a plurality of different winning symbol combinations, said plurality of different winning symbol combinations being associated with a plurality of different values (g) for each of a second quantity of said wagered-on predetermined paylines, said second quantity being at least one and less than or equal to said first quantity, if the payline wager amount placed by the player on said wagered-on predetermined payline has been modified and if the randomly generated and displayed symbols at the plurality of symbol positions associated with said wagered-on predetermined payline form any of the plurality of different winning symbol combinations, determine an award for said formed winning symbol combination by multiplying:

(i) the value associated with the formed winning symbol combination, by (ii) the modified payline wager amount for said wagered-on predetermined payline; and (h) provide any determined awards to the player.

2. The gaming device of claim 1, wherein when executed by the at least one processor, the plurality of instructions cause the processor to, if the randomly generated and displayed symbols include the designated quantity of predetermined triggering symbols, for each of the first quantity of wagered-on predetermined paylines, increase the payline wager amount placed on said wagered-on predetermined payline.

3. The gaming device of claim 1, wherein when executed by the at least one processor, the plurality of instructions cause the processor to, if the randomly generated and displayed symbols include the designated quantity of predetermined triggering symbols, for each of the first quantity of wagered-on predetermined paylines, decrease the payline wager amount placed on said wagered-on predetermined payline.

4. The gaming device of claim 1, wherein when executed by the at least one processor, the plurality of instructions cause the processor to, if the randomly generated and displayed symbols include the designated quantity of predetermined symbols:

(a) for at least one of the first quantity of wagered-on predetermined paylines, decrease the payline wager amount placed on said at least one wagered-on predetermined payline; and (b) for at least another one of the first quantity of wagered-on predetermined paylines, increase the payline wager amount placed on said at least another one wagered-on predetermined payline.

5. The gaming device of claim 1, wherein the first quantity of the wagered-on predetermined paylines is greater than one.

6. The gaming device of claim 1, wherein, for at least one of the predetermined paylines, the randomly determined amount is randomly determined, at least in part, based on the player's wager.

7. The gaming device of claim 1, wherein the second quantity is different from the first quantity.

8. A method of operating a gaming device including a plurality of instructions, said method comprising:

(a) for each of a plurality of predetermined paylines, enabling a player to participate in a play of a wagering game by placing an individual payline wager amount on said predetermined payline, each said predetermined payline associated with a different plurality of symbol positions;

(b) causing at least one processor to randomly generate a plurality of symbols from a plurality of different symbols, said plurality of different symbols including at least one predetermined triggering symbol;

(c) causing at least one display device to display the randomly generated plurality of symbols at the different plurality of symbol positions;

(d) causing the at least one processor to execute the plurality of instructions to determine whether the randomly generated and displayed symbols include a designated quantity of the predetermined triggering symbols, the designated quantity being at least one;

(e) if the randomly generated and displayed symbols include the designated quantity of the predetermined triggering symbols, for each of a first quantity of wagered-on predetermined paylines:

(i) causing the at least one processor to execute the plurality of instructions to modify the payline wager amount placed by the player on said wagered-on predetermined payline by a randomly determined amount, said modification occurring without requiring the player to place any additional wagers, said first quantity being at least one, said amount being randomly determined regardless of which of the symbol positions each of the randomly generated predetermined triggering symbols are displayed at; and (ii) causing the at least one display device to display each modified payline wager amount;

(f) for each wagered-on predetermined payline, causing the at least one processor to execute the plurality of instructions to determine whether the randomly generated and displayed symbols at the plurality of symbol positions associated with said wagered-on predetermined payline form any of a plurality of different winning symbol combinations, said plurality of different winning symbol combinations being associated with a plurality of different values;

(g) for each of a second quantity of said wagered-on predetermined paylines, said second quantity being at least one and less than or equal to said first quantity, if the payline wager amount placed by the player on said wagered-on predetermined payline has been modified and if the randomly generated and displayed symbols at the plurality of symbol positions associated with said wagered-on predetermined payline form any of the plurality of different winning symbol combinations, causing the at least one processor to execute the plurality of instructions to determine an award for said formed winning symbol combination by multiplying:

(i) the value associated with the formed winning symbol combination, by (ii) the modified payline wager amount for said wagered-on predetermined payline; and (h) providing any determined awards to the player.

9. The method of claim 8, which includes, if the randomly generated and displayed symbols include the designated quantity of predetermined triggering symbols, for each of the first quantity of wagered-on predetermined paylines, causing the at least one processor to execute the plurality of instructions to increase the payline wager amount placed on said wagered-on predetermined payline.

10. The method of claim 8, which includes, if the randomly generated and displayed symbols include the designated quantity of predetermined triggering symbols, for each of the first quantity of wagered-on predetermined paylines, causing the at least one processor to execute the plurality of instructions to decrease the payline wager amount placed on said wagered-on predetermined payline.

11. The method of claim 8, which includes, if the randomly generated and displayed symbols include the designated quantity of predetermined symbols:

(a) for at least one the first quantity of wagered-on predetermined paylines, causing the at least one processor to execute the plurality of instructions to decrease the payline wager amount placed on said at least one wagered-on predetermined payline; and (b) for at least another one the first quantity of wagered-on predetermined paylines, causing the at least one processor to execute the plurality of instructions to increase the payline wager amount placed on said at least another one wagered-on predetermined payline.

12. The method of claim 8, wherein the first quantity of the wagered-on predetermined paylines is greater than one.

13. The method of claim 8, wherein, for at least one of the predetermined paylines, the randomly determined amount is randomly determined, at least in part, based on the player's wager.

14. The method of claim 8, which is controlled through a data network.

15. The method of claim 14, wherein the data network is an internet.

16. The method of claim 8, wherein the second quantity is different from the first quantity.

17. A gaming device comprising:

at least one display device;

at least one input device;

at least one processor; and at least one memory device which stores a plurality of instructions, which when executed by the at least one processor, cause the at least one processor to operate with the at least one display device and the at least one input device, for a play of a wagering game, to:

(a) for each of a plurality of predetermined paylines, enable a player to participate in the play of the wagering game by placing an individual payline wager amount on said predetermined payline, each said predetermined payline being associated with a different plurality of symbol positions;

(b) randomly generate a plurality of symbols from a plurality of different symbols, said plurality of different symbols including at least one predetermined triggering symbol;

(c) display the randomly generated plurality of symbols at the different plurality of symbol positions;

(d) for each wagered-on predetermined payline, determine whether the randomly generated and displayed symbols at the plurality of symbol positions associated with said wagered-on predetermined payline form any of a plurality of different winning symbol combinations, said plurality of different winning symbol combinations being associated with a plurality of different values;

(e) determine whether the randomly generated and displayed symbols include a designated quantity of the predetermined triggering symbols, the designated quantity being at least one;

(f) for each of a first quantity of wagered-on predetermined paylines, if the randomly generated and displayed symbols include the designated quantity of the predetermined triggering symbols and if the randomly generated and displayed symbols at the plurality of symbol positions associated with said wagered-on predetermined payline form any of the plurality of different winning symbol combinations:

(i) employ an alternative value associated with said formed winning symbol combination, employing said alternative value occurring without requiring the player to place any additional wagers, said first quantity being at least one, said alternative value being determined regardless of which of the symbol positions each of the randomly generated predetermined triggering symbols are displayed at; and (ii) display each alternative value;

(g) for each of a second quantity of said wagered-on predetermined paylines, said second quantity being at least one and less than or equal to said first quantity, if the randomly generated and displayed symbols at the plurality of symbol positions associated with said wagered-on predetermined payline form any of the plurality of different winning symbol combinations and if the alternative value is associated with said formed winning symbol combination, determine an award for said formed winning symbol combination based on:

(i) the alternative value associated with the formed winning symbol combination; and (ii) the payline wager amount for said wagered-on predetermined payline; and (h) provide any determined awards to the player.

18. The gaming device of claim 17, wherein the first quantity of the wagered-on predetermined paylines is greater than one.

19. The gaming device of claim 17, wherein, for at least one of the predetermined paylines, the alternative value is randomly determined, at least in part, based on the player's wager.

20. The gaming device of claim 17, wherein the second quantity is different from the first quantity.

21. A method of operating a gaming device including a plurality of instructions, said method comprising:

(a) for each of a plurality of predetermined paylines, enabling a player to participate in the play of the wagering game by placing an individual payline wager amount on said predetermined payline, each said predetermined payline being associated with a different plurality of symbol positions;

(b) causing at least one processor to randomly generate a plurality of symbols from a plurality of different symbols, said plurality of different symbols including at least one predetermined triggering symbol;

(c) causing at least one display device to display the randomly generated plurality of symbols at the different plurality of symbol positions;

(d) for each wagered-on predetermined payline, causing the at least one processor to execute the plurality of instructions to determine whether the randomly generated and displayed symbols at the plurality of symbol positions associated with said wagered-on predetermined payline form any of a plurality of different winning symbol combinations, said plurality of different winning symbol combinations being associated with a plurality of different values;

(e) causing the at least one processor to execute the plurality of instructions to determine whether the randomly generated and displayed symbols include a designated quantity of the predetermined triggering symbols, the designated quantity being at least one;

(f) for each of a first quantity of wagered-on predetermined paylines, if the randomly generated and displayed symbols include the designated quantity of the predetermined triggering symbols and if the randomly generated and displayed symbols at the plurality of symbol positions associated with said wagered-on predetermined payline form any of the plurality of different winning symbol combinations:

(i) causing the at least one processor to execute the plurality of instructions to employ an alternative value associated with said formed winning symbol combination, wherein employing said alternative value occurs without requiring the player to place any additional wagers, said first quantity being at least one, said alternative value being determined regardless of which of the symbol positions each of the randomly generated predetermined triggering symbols are displayed at; and (ii) display each alternative value;

(g) for each of a second quantity of said wagered-on predetermined paylines, said second quantity being at least one and less than or equal to said first quantity, if the randomly generated and displayed symbols at the plurality of symbol positions associated with said wagered-on predetermined payline form any of the plurality of different winning symbol combinations and if the alternative value is associated with said formed winning symbol combination, causing the at least one processor to execute the plurality of instructions to determine an award for said formed winning symbol combination based on:

(i) the alternative value associated with the formed winning symbol combination; and (ii) the payline wager amount for said wagered-on predetermined payline; and (h) providing any determined awards to the player.

22. The method of claim 21, wherein the first quantity of the wagered-on predetermined paylines is greater than one.

23. The method of claim 21, wherein, for at least one of the predetermined paylines, the alternative value is randomly determined, at least in part, based on the player's wager.

24. The method of claim 21, wherein the second quantity is different from the first quantity.

* * * * *